United States Patent [19]

Lee

[11] Patent Number: 4,759,275

[45] Date of Patent: Jul. 26, 1988

[54] GLASS POT FOR DECOCTING CHINESE HERBS OR TEAS

[76] Inventor: Sang J. Lee, 221-38, Suyu 3-Dong, Dobong-Ku, Seoul, Rep. of Korea

[21] Appl. No.: 86,489

[22] Filed: Aug. 18, 1987

[30] Foreign Application Priority Data

Aug. 19, 1986 [KR] Rep. of Korea ............. 86-12566

[51] Int. Cl.⁴ ............................................. A47J 31/18
[52] U.S. Cl. ........................................ 99/317; 99/323
[58] Field of Search ............... 99/279, 293, 306, 316, 99/317, 318, 319, 321, 322, 323, 403; 426/433

[56] References Cited

U.S. PATENT DOCUMENTS

| | | | |
|---|---|---|---|
| 1,382,574 | 6/1921 | Tortorice | 99/317 |
| 1,758,407 | 5/1930 | Parkinson | 99/317 |
| 2,626,560 | 1/1953 | Burkhardt | 99/319 |
| 2,893,331 | 7/1959 | Medlock | 99/317 |

*Primary Examiner*—Robert W. Jenkins
*Attorney, Agent, or Firm*—Saidman, Sterne, Kessler & Goldstein

[57] ABSTRACT

A glass pot for decocting Chinese herbs or tea comprising a glass pot body and a metal bottom. The pot also comprises a small container received in the interior of the pot body, said container including a glass container body and a metal bottom having a plurality of holes. The container is covered by a lid having a rim. A steam condenser is mounted on the upper end of pot body to condense the steam discharged from the pot into water.

2 Claims, 2 Drawing Sheets

GLASS POT FOR DECOCTING CHINESE HERBS OR TEAS

TECHNICAL FIELD

The present invention relates to a glass pot for decocting Chinese herbs or teas, and particularly to a glass pot comprising glass body and metal bottom, a small container positioned in the interior of said pot body and provided, at the bottom thereof, with a plurality of holes, and a steam condenser mounted on the upper portion of the pot body.

BACKGROUND OF THE INVENTION

Such type of glass pots comprising a glass pot body with a metal bottom was disclosed in the Korean Utility Model Registration No. 14210 (publication No. 77-62) issued to the inventor of the present invention. This arrangement can improve the thermal efficiency and lengthen the operating life, as compared with the previous glass pots or clay pots, and simultaneously make it possible to watch the inside.

However, in the case decocting Chinese herbs or tea, there still remain problems that the decocted materials and the dregs have to be filtered after decocting, and that lots of foams frequently overflows the pots, particularly in case of decocting ginseng, and that lots of medicinal elements in herbs entrained in the steam are disadvantageously discharged from the pots. In the case of genseng particularly, the discharged quantity of medicine elements contained in the steam has been thought to be considerably great.

SUMMARY OF THE INVENTION

Therefore, an object of the present invention is to provide a glass pot which eliminates problem encountered in the above mentioned prior art.

In accordance with the present invention, the object is accomplished by providing decocting Chinese herbs or teas comprising: a glass pot body with a metal bottom having an upward circular protrusion at the center thereof; a small container received in the interior of said pot body, said container including a container body made of glass and a bottom made of metal having an upward circular protrusion to be fittably overlapped to the said protrusion of the pot bottom, said protrusion having a plurality of holes and said bottom having a handle bar upwardly extending therefrom; a lid adapted to cover the said small container and provided, at the peripheral edge thereof, with a rim; and a steam condenser mounted on the upper end of the said pot body and adapted to condense the steam discharged from the pot into water.

In accordance with the present invention, the steam condenser comprises a plurality of glass tubes vertically connected in a multistage fashion. Each glass tube has a shape of narrow upper and lower portions and a wide middle portion. Each tube also is provided with at the upper end thereof a funnel with an air outlet.

BRIEF DESCRIPTION OF THE DRAWINGS

The present invention will now be described, by way of example only, with reference to the accompanying illustrative drawings in which.

DETAILED DESCRIPTION OF THE PREFERRED EMBODIMENTS

Figure 1:
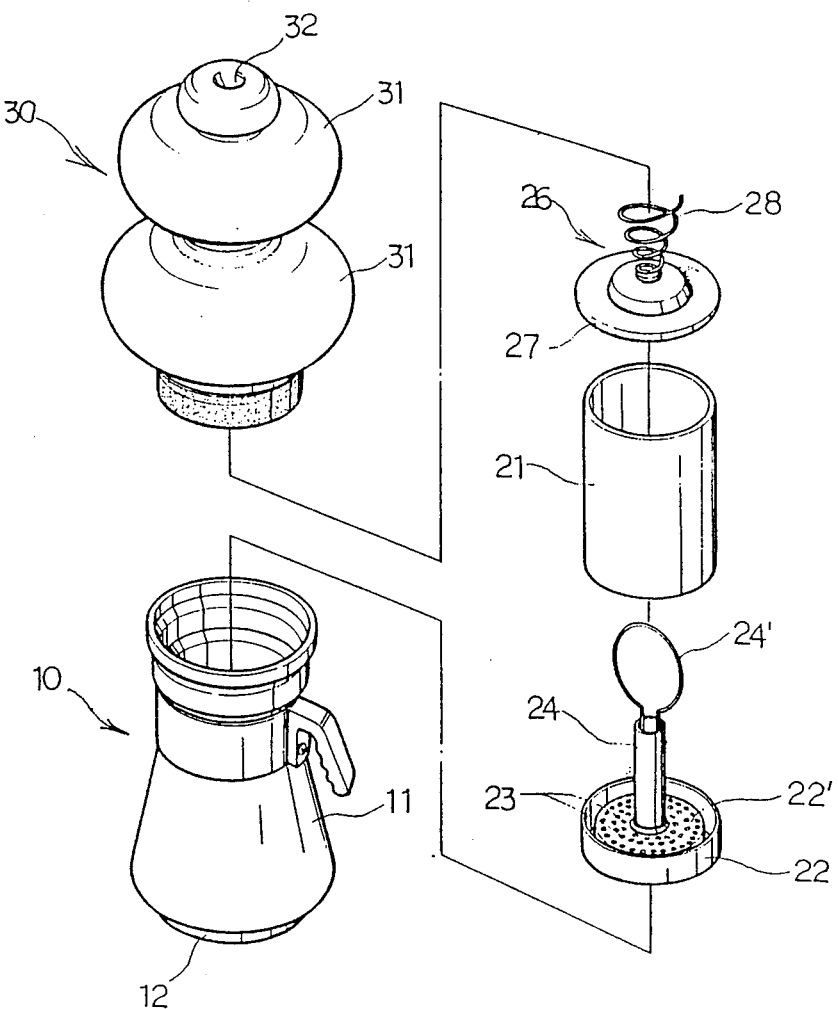
FIG. 1 is an exploded perspective view of a pot in accordance with the present invention.
Figure 2:
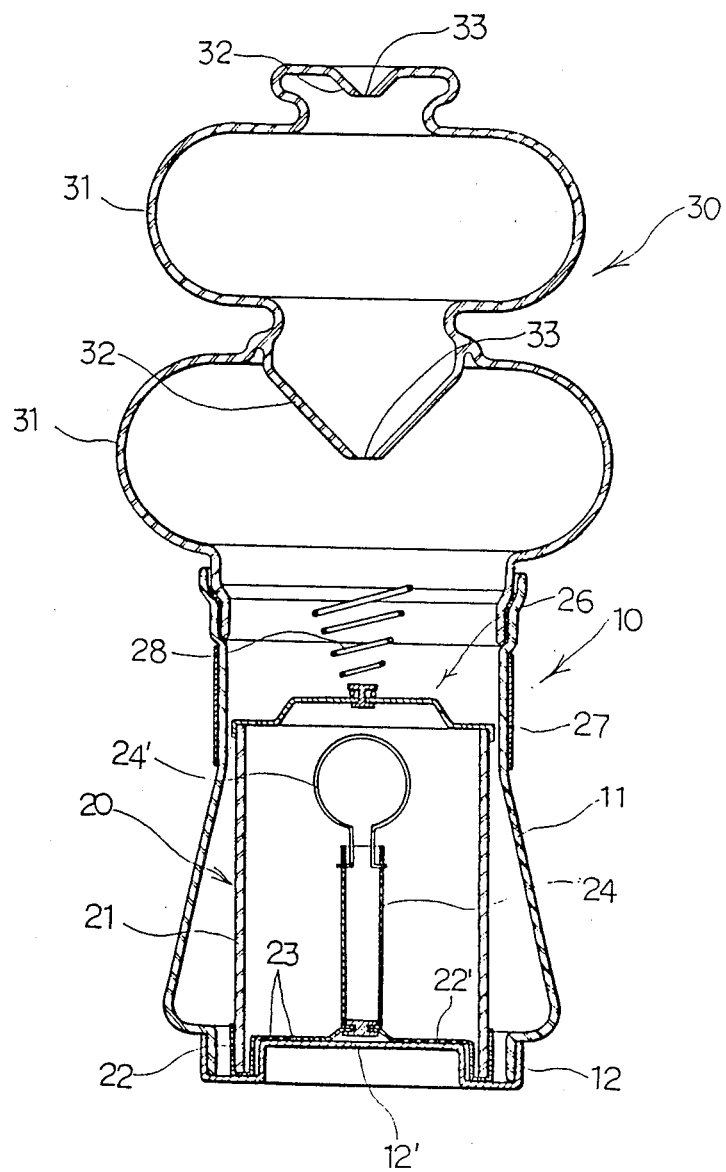
FIG. 2 is a sectional view of the pot of FIG. 1 in assembled state.

Referring to FIGS. 1 and 2, a glass pot 10 of the present invention is shown, which conventionally comprises a glass pot body 11 with a metal bottom 12. The metal bottom 12 is provided, at the center thereof, with an upward circular protrusion 12' which provides, at the interior thereof, a space to receive a heating plate of a heater (not shown). Within the pot 10, a small container 20 is placed, which comprises a glass container body 21 and metal bottom 22. The metal bottom 22 of the small container 20 has a plurality of small holes 23 and upward circular protrusion 22' for overlappedly receiving the protrusion 12' of the pot bottom 12 therein. The small container 20 also has a lid 26 provided with a rim 27 and a handle 28. On the bottom 22 of the container 20, an upwardly extended bar 24 is mounted, which is provided at the upper end thereof with ring 24'. The bottom 22 of the container 20 is separably coupled to the container body 21, as shown in FIG. 1. On the upper portion of the pot 10, is mounted a steam condenser 30 made of glass, which comprises a plurality of, desirably two to three, glass tubes 31. Each glass tube 31 is shaped such that upper and lower portions thereof are wide, while the middle portion is narrow. Each tube 31 has at the upper end thereof a funnel 31 having an air outlet 33.

Now, the operation of the pot according to the present invention will be described in detail. As a heater(not shown) is actuated after water is poured into the pot 10 in which the small container 20 already containing Chinese herb or tea materials has been received, heat is concentratedly transmitted from the heater to the protrusion 22' of the small container 20, so that herb or tea materials can be well dococted. The small container 20 is covered by the lid 26 having the rim 27, so that even when a lot of foams are generated in the course of decocting ginseng, the overflow of foam can be effectively prevented.

Thus, foams are confined within the container, thereby functioning as a thermal insulation, so that the heat from the heater can be concentrated in the interior of the container 20. And also, steam in the container 20 are more or less compressed, so that the condensation of steam can be facilitated. The water containing medicinal elements extracted from the decocted materials circulates through the small holes 23 formed on the bottom protrusion 22' of the container between the inside of the container and that of the pot.

When Chinese herbs are sufficiently decocted, the user grips the 24' of the handle bar 24 after the lid 26 is removed, and pulls it up so that the container 20 is taken out from the pot 10. Thus, the decocted materials and the dregs are completely seperated from the water without filtering. If the container bottom 22, on which the decocted materials and the dregs are deposited, is seperated from the container body 21 by taking out the container 20 from the pot 10 and then pulling up said container body 21, the decocted materials and the dregs can be easily removed.

The steam condenser 30 functions to condense the steam generated in the pot 10 into water, and then returns the water to the pot 10. Accordingly, the possible loss of medicine elements contained in the steam due to the discharge of steam can be minimized. In the virtue of the fact that the steam condenser 30 comprises several tubes connected in a multistage fasion and each having a shape of wide upper and lower portions and a narrow middle portion the efficiency of the steam condensation can be highly increased. Accordingly, it is possible to prevent the discharge of the steam from the steam condenser 30 through funnel 33 provided at the upper end of said condenser 30, if the heat supplied from the heater is properly controlled.

While a preferred embodiment has been described, variations thereto will occur to those skilled in the art within the scope of the present inventive concepts which are delineated by the following claims.

What is claimed is:

1. A glass pot for decocting Chinese herbs or tea comprising:

a glass pot body with a metal bottom having an upward circular protrusion at the center thereof;

a small container received in the interior of the said pot body, said container including a container body made of glass and a bottom made of metal having an upward circular protrusion to be fittably overlapped to said protrusion of pot body, said protrusion having a plurality of small holes, and said bottom also having a handle upwardly extending therefrom;

a lid with a rim formed therearound adapted to cover said small container;

and a steam condenser mounted on the upper end of the said pot body and adapted to condense the steam discharged from the pot into water.

2. A glass pot in accordance with claim 1, wherein said steam condenser comprises a plurality of glass tubes each having a shape of narrow upper and lower portions and a wide middle portion, said tubes vertically connected in a multistage fashion, each tube also having at the upper end thereof a funnel with an air outlet.

* * * * *